(No Model.)
G. O. BREWER.
HARNESS.
No. 449,201. Patented Mar. 31, 1891.
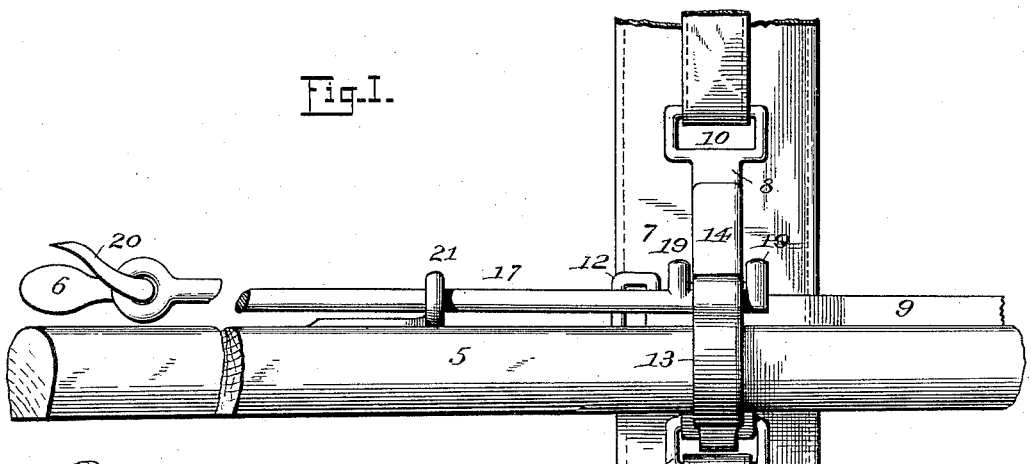
Fig. I.
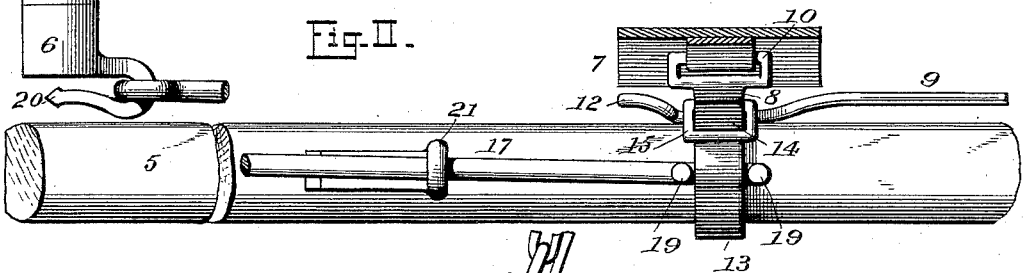
Fig. II.
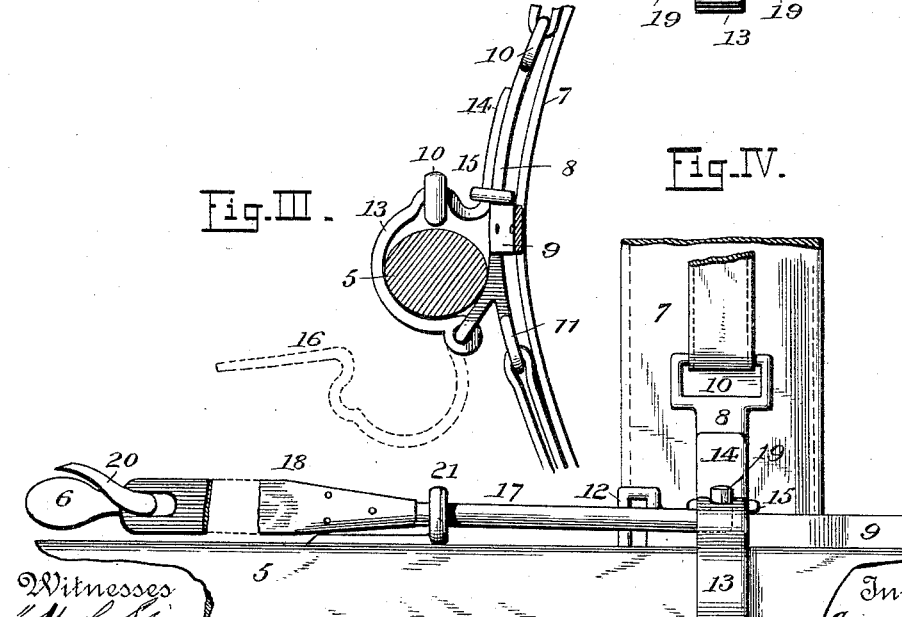
Fig. III. Fig. IV.
Witnesses
Inventor
George O. Brewer.
Attorney W. X. Stevens.

UNITED STATES PATENT OFFICE.

GEORGE O. BREWER, OF SHENANDOAH, IOWA.

HARNESS.

SPECIFICATION forming part of Letters Patent No. 449,201, dated March 31, 1891.

Application filed January 2, 1891. Serial No. 376,468. (No model.)

*To all whom it may concern:*

Be it known that I, GEORGE O. BREWER, a citizen of the United States, residing at Shenandoah, in the county of Page and State of Iowa, have invented certain new and useful Improvements in Trace-Carriers; and I do hereby declare the following to be a full, clear, and exact description of the invention, such as will enable others skilled in the art to which it appertains to make and use the same.

This invention relates to that portion of harness for horses by means of which the thills of a carriage or wagon are supported, and by means of which the horse is attached to the wagon or carriage to draw it and to back it; and its object is to provide means whereby the horse may be quickly attached or detached both to the thills and to the whiffletree by a single act at each side of the horse, and yet maintain that freedom and ease of movement which is produced by trace and whiffletree attachments.

To this end my invention consists in the construction and combination of parts forming trace-carriers hereinafter described and claimed, reference being had to the accompanying drawings, in which—

Figure I is a side elevation of a portion of a thill and harness attached thereto according to my invention, a portion of the thill being brought forward to show the whiffletree-connection. Fig. II is a plan or top view of the same. Fig. III is a front side view of the thill-supporter, showing also the thill and adjacent portion of the harness in transverse vertical section. Fig. IV shows a modification in side view.

5 represents a thill of any vehicle; 6, the whiffletree, and 7 the girth or back-band of a harness. To this back-band I attach a piece of metal 8, in the shape of a cross, having a forward arm 9, adapted to be connected with the hame-tug or with a breast-strap or other similar device intended to go around the breast of the horse, whereby he exerts his main pulling force.

10 represents a loop in the upper arm of a cross-piece 8, whereby the back-band is attached to support this cross-piece.

11 represents a similar loop at the end of the lower arm of the cross-piece, to which a belly-band may be attached, or, more properly, the band which holds the thills from rising upward when the horse is backing.

12 represents a loop in the rear end of the cross 8, whereby the breeching-strap may be attached. To the lower arm of the cross-piece is attached by a hinge a hook-shaped piece 13, having a tang 14 at its upper end, to lay parallel with and flat against the upper arm of the cross-piece.

15 is a rectangular ring fitted to slide up and down around both the said upper arm and the tang 14 to hold the tang in its working position against the cross-piece. This ring, being slipped upward over the end of the tang, permits the hook to fall outward and downward freely, of its own weight, to the position shown in dotted lines 16. The hook, in its normal or working position, is adapted to pass freely around and to support the thill 5. When the hook is swung outward the thill may be taken up against the side of the horse, the hook raised around it, and the tang of the hook may be instantly secured by the ring 15. All shaking of the harness tends to work the ring 15 closer down upon the tang, so that it never can become accidentally unfastened.

17 represents a trace, which is a prominent feature of my invention. This trace may be a stiff rod connected directly with the whiffletree 6, as shown in Fig. I and II, or it may have a stiff portion at the forward end, connected with the whiffletree by a flexible portion 18, as shown in Fig. IV. This trace 17 is provided at its forward end with a pair of projecting studs 19, adapted to stand upward or outward before and behind the hook 13, to engage the same while in service. When carrying the hook 13 upward around the thill, as before described, it is only necessary to see that the hook passes between these studs 19, and when the tang 14 is secured by the ring 15 the studs 19 cannot be disengaged from the hook 13, though the hook plays freely between them. When the trace-bar 17 is made of metal throughout its length, it is stiff enough to serve as means for backing the vehicle; but it may also be used when made partly flexible, as shown in Fig. IV, 1 connection with a common holdback-hook 20, located on the thill, which will be acted upon by the hook 13, like the old-style th 1 supporter. In either case this trace, deta ably connected with the harness by means of the detachable hook 13, is the means which I provide for attaching the horse for drawing the vehicle.

21 is a staple or eye upon the thill, through which the stiff bar 17 of the trace slides freely; yet the trace-bar is permanently connected with the thill thereby, so that, instead of being connected permanently with the harness as a portion thereof, my traces are connected with the thills, and when the horse is removed from the vehicle the traces are left attached to the latter.

It may thus be seen that in the act of quickly attaching the thills by means of the hook 13 the traces are also attached, and the same may be said of detaching the thills and traces, so that a person need not expose himself to being kicked by a vicious horse while attaching or detaching him, and however fractious the horse may be it is almost impossible for him to get out of place while being attached, or to do any great damage before he could be detached and set wholly free.

It is evident that a single stud 19 and a free loop or hole in the hook 13, as shown in Fig. IV, would serve the same purpose as the two studs 19 shown in the other figures, and it would not affect the nature of my invention whether the stud were on the trace or the hook, so long as opening the hook would set the trace free.

Having thus fully described my invention, what I believe to be new, and desire to secure by Letters Patent, is the following:

1. The combination of a trace adapted at its rear end to be connected with a whiffletree and at its forward end to rest upon a thill, and a thill-supporter having a hook portion hinged at its lower end to a fixed portion of the harness and adapted to encircle both a thill and the free forward end of the said trace, the latter being provided with one or more studs adapted to engage the said hook, substantially as described.

2. The combination of a trace having a stiff forward end adapted to lie upon a thill, and provided with one or more projecting studs, and a thill-supporter having a hinged hook adapted to carry the thill, and having an upward curve wherein the trace may rest freely, the said stud or studs adapted to engage the said hook, substantially as described.

In testimony whereof I affix my signature in presence of two witnesses.

GEORGE O. BREWER.

Witnesses:
W. P. FERGUSON,
W. H. BREWER.